(12) United States Patent
Wobben

(10) Patent No.: US 6,688,841 B1
(45) Date of Patent: Feb. 10, 2004

(54) WIND ENERGY SYSTEM WITH ADJUSTMENT OF THE SOUND LEVEL

(76) Inventor: Aloys Wobben, Argestrasse 19, Aurich D-26607 (DE)

( * ) Notice: Subject to any disclaimer, the term of this patent is extended or adjusted under 35 U.S.C. 154(b) by 0 days.

(21) Appl. No.: 10/009,425
(22) PCT Filed: Mar. 11, 2000
(86) PCT No.: PCT/EP00/02159
§ 371 (c)(1),
(2), (4) Date: May 13, 2002
(87) PCT Pub. No.: WO00/77395
PCT Pub. Date: Dec. 21, 2000

(30) Foreign Application Priority Data

Jun. 10, 1999 (DE) .......................... 199 26 437
Jun. 11, 1999 (DE) .......................... 199 26 553

(51) Int. Cl.$^7$ .............................. F03D 7/00; F03D 11/00
(52) U.S. Cl. ......................................................... 415/1
(58) Field of Search ............................. 415/1, 15, 119, 415/118; 416/35, 61

(56) References Cited

U.S. PATENT DOCUMENTS 5,315,159 A     5/1994   Gribnau ...................... 290/55
5,422,826 A  *  6/1995   Cousineau ................... 416/36
6,213,721 B1 *  4/2001   Watkinson .................. 416/119

FOREIGN PATENT DOCUMENTS

GB       2308867 A     7/1997
WO     WO 96/30669    10/1996

OTHER PUBLICATIONS

"Sound from Wind Turbines," *Danish Wind Turbine Manufactures Association Web Site*; 1–3, Jul. 7, 2000, http://www.windpower.dk/tour/env.sound.htm.

Abstract of JP 55054678, Patent Abstracts of Japan, Jul. 11, 1980.

* cited by examiner

*Primary Examiner*—Edward K. Look
*Assistant Examiner*—Igor Kershteyn

(57) ABSTRACT

In a method for enabling a wind energy system to stay within noise immission limits, the rotational speed of the turbine rotor is reduced as soon as set values are reached in terms of sound level, wind speed, direction of the wind or time of the day. The second part of the inventive method consists in installing wind turbines which do not have a reduced speed on the side of a first wind turbine which is sheltered from the wind so that the first turbine has a reduced speed.

16 Claims, 2 Drawing Sheets

Calculation example

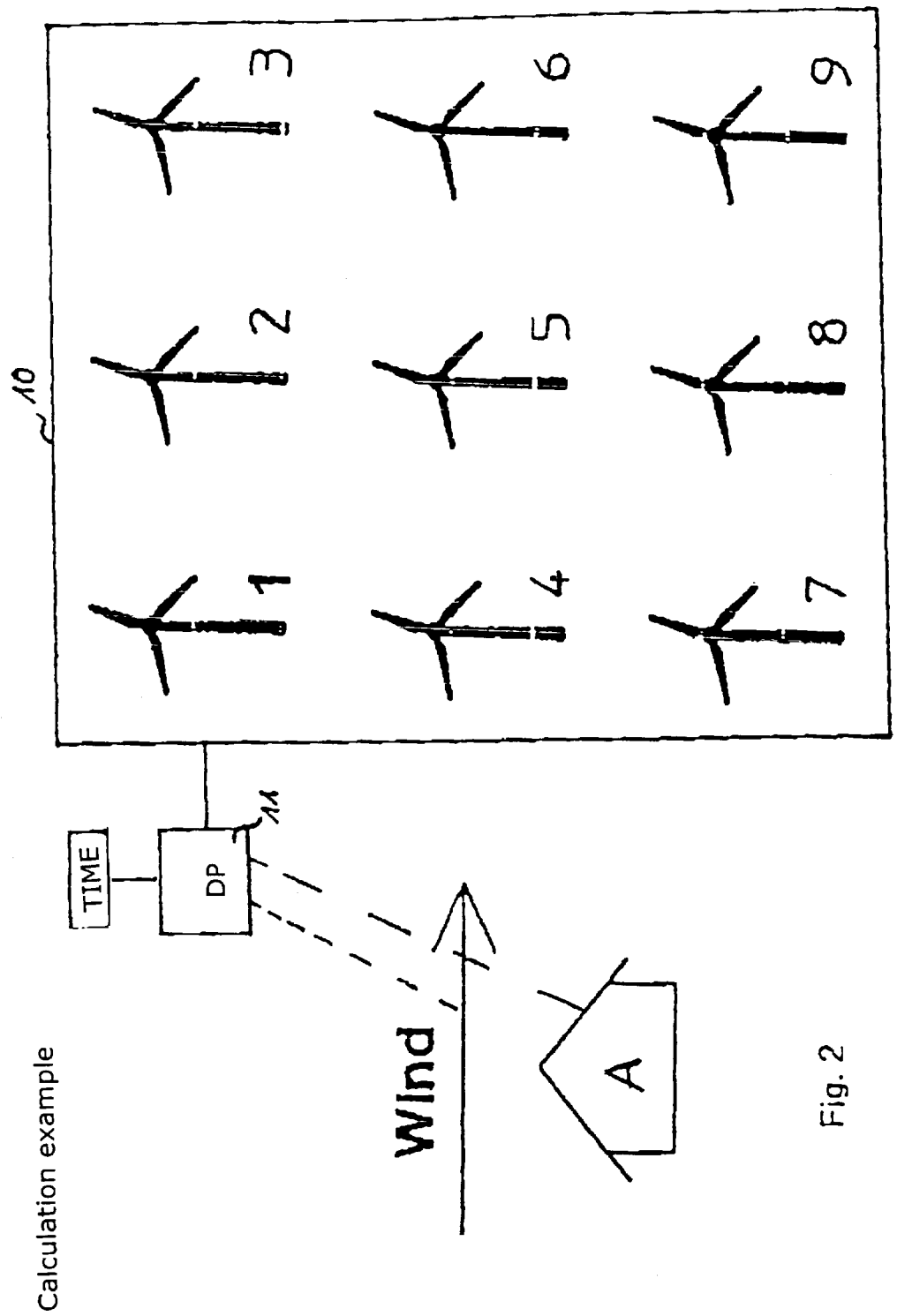

WIND ENERGY SYSTEM WITH ADJUSTMENT OF THE SOUND LEVEL

BACKGROUND OF THE INVENTION

In the planning and implementation of wind parks, the levels of sound emission to be expected are playing an increasingly important part in terms of approval and acceptance. The sound immission calculations which are required for that purpose are generally based on measured sound output levels ($L_W$) of the wind power installations and are implemented with current software programs. Sound immission measurements are also taking place more and more frequently so that the sound level of an individual installation or the sound level of an entire wind park can be ascertained at a given immission point (outside or within the wind park). If the immission point is an individual house, a housing estate or the like, there a certain sound output level must be observed at least over given periods of time, for example between 10 pm and 6 am, in accordance with the statutory provisions and the provisions relating to planning policy. It is also not permitted for the sound output level at an immission point, for example a housing estate, to rise beyond all measure during the day.

The interest in observing the required sound output levels at one or more immission points is in conflict with the interest on the part of the operator of the wind park of achieving the maximum energy yield with the wind park. Admittedly, by means of total shutdown of all wind power installations of the wind park at night, the observance of sound limit values would be satisfied, but the entire wind park operation would then be highly ineffective.

SUMMARY OF THE INVENTION

Therefore the object of the present invention, in spite of observing sound output limit values at one or more immission points, is to maximize the energy yield of the wind park according to the respective time of day, wind direction and wind strength.

The invention is based on the realization that the sound emission of a wind power installation is dependent on various parameters and categories. When considered in rough terms, sound production can be subdivided into two categories. One category is tone relatedness, that is to say the generation of sound by the machine part (drive part) of the wind power installation. That is also identified as so-called mechanical sound. The other category is a wide-band noise of the wind power installation, caused by aerodynamic sound by the rotor blades and other wide-band machine noises, for example fans.

The so-called mechanical sound can originate from various mechanical components such as for example a generator and/or a transmission assembly. The sound is transmitted for example by way of the structure of the installation and is radiated from the surfaces thereof. That sound is generally of tone-related character, that is to say, sound irradiation can be association with a given frequency. The sound sources can be determined so that it is possible to take suitable countermeasures (for example decoupling in respect of sound conducted through solids).

The sound output level of a wind power installation is however substantially determined by the aerodynamic noises which are produced by the air flows at the rotor blades. As sound generation is related approximately at the fifth power to the blade tip speed, an increased rotary speed always also entails an increased level of sound emission. That noise involves a wide-band frequency spectrum. For a rotor diameter of 40 m, a change in the sound output level by 1 dB(A) was ascertained, per rotor revolution per minute. It is to be noted in that respect that a reduction in the sound output level by 3 dB(A) already corresponds to a halving of that value (in acoustically audible terms).

BRIEF DESCRIPTION OF THE DRAWINGS

FIG. 2 shows an example of a wind park in which three wind power installations are arranged in each of three respective rows.

DETAILED DESCRIPTION

Figure 1:
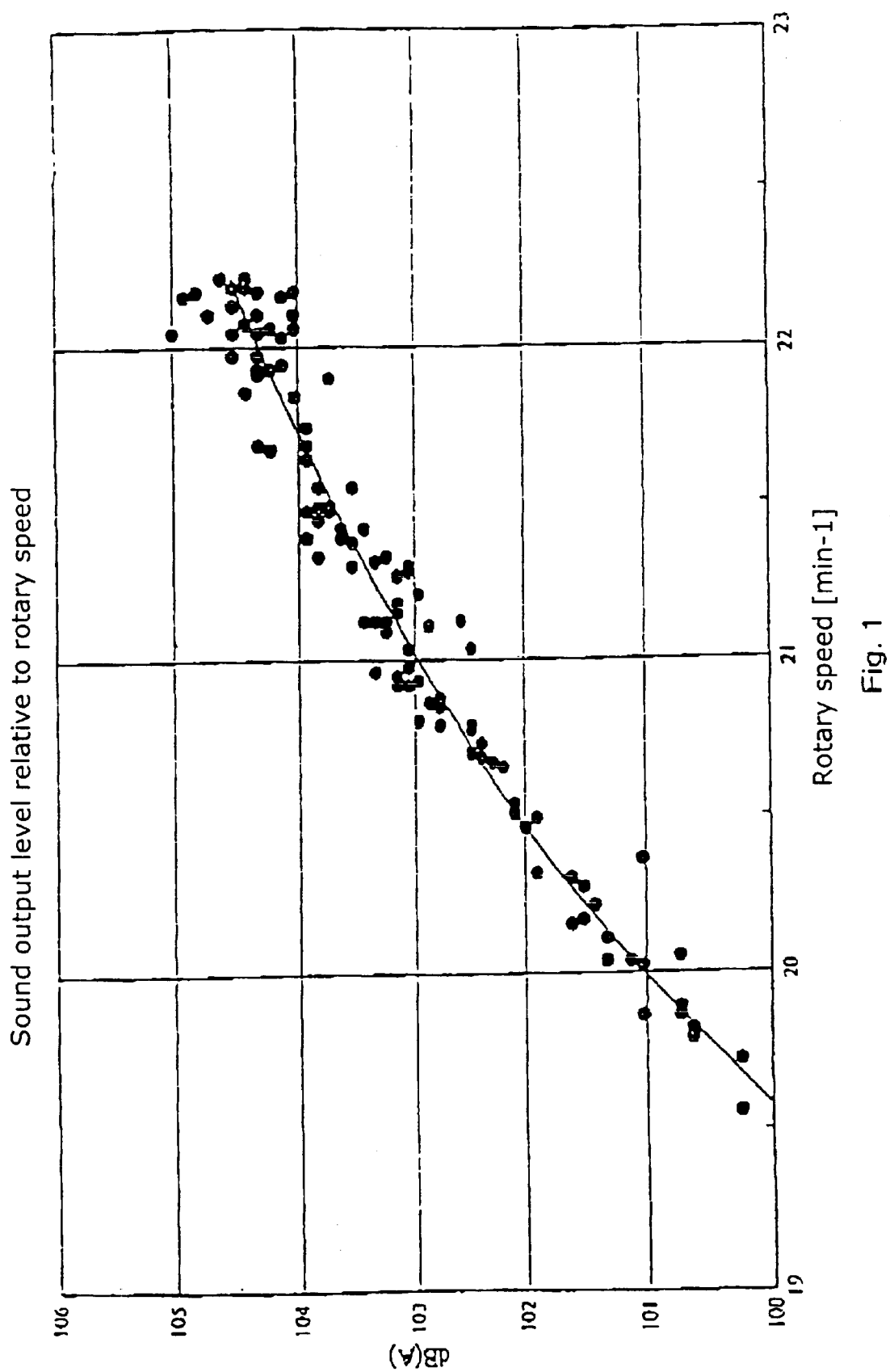
FIG. 1 is a graph showing the dependency of the sound output level on the rotary speed.

The dependency of the sound output level (in decibels) on the rotary speed of a wind power installation is shown in FIG. 1. This involves a wind power installation of type E-66 from Enercon. It will be noted in this respect that, in the case of a wind power installation of this type, at a rotary speed of 22 revolutions per minute, the irradiated sound is between about 104 and 105 dB, while at a rotary speed of about 20 revolutions per minute the sound output level already falls to about 101 dB.

The statutory provisions regarding observance of sound limit values require given values according to the respective location (a residential area, a mixed area, or an industrial area) and the time of day. In general terms markedly lower values are to be observed for example between 10 pm and 6 am, than during the day.

It is therefore proposed that either the level of system efficiency of a wind power installation is reduced, that is to say the desired generator output is implemented at lower rotary speeds (different rotary speed-output characteristic) or, if that is not sufficient, the rotary speed and thus indirectly also the generator output are reduced. Both possible options can be used by means of an electronic control during the night or at other critical times.

A transmission-free wind power installation involving a variable rotary speed, with an adjustable rotary speed-output characteristic (for example of types E-12, E-30, E-40, E-58 and E-66 from Enercon) in conjunction with the flexible control according to the invention affords the possibility of operating the wind power installations in dependence on the time of day at limited maximum rotary speeds and thus lower sound output levels.

In a wind park with a group of a plurality of wind power installations which are set up in a plurality of rows the wind, under given wind direction conditions, first impinges on the first row of wind power installations. They take kinetic energy from the wind and the wind speed is thus reduced. The second row of installations which are arranged behind the first row (still from the point of view of wind direction) therefore experience a lower wind speed than the first row. The next row (and so forth) experiences an even lower wind speed. In the case of installations involving a variable rotary speed, the rotor rotary speed also behaves in accordance with the magnitude of the wind speed and linked thereto the electrical output produced falls with a lower strength of wind in regard to those installations which are positioned behind the first row. Accordingly the mode of erection of the installations in the wind park already affords a gradation in the sound output levels of the individual installations.

If now the statutory provision in regard to observing maximum sound levels has to be observed at one or more immission point outside the wind park, in accordance with the invention, to control the individual installations of the wind park, it is proposed that they are so operated that, at the immission point (or at the immission points), the overall sound levels occurring are so low that predetermined limit values are observed.

FIG. 2 shows an example of a wind park in which three wind power installations are arranged in each of three respective rows. It be assumed that a house which is standing alone is positioned at the immission point A and the wind impinges on the wind park from the direction of the house, that is to say the immission point A. For the above-mentioned reasons, the wind speed for the installations in the first row (Nos 1, 4 and 7) is at its greatest while the wind impinges on the installations in the subsequent rows at a lower wind speed. Due to the higher wind speed, without the control in accordance with the invention, the rotary speed of the installations in the first row would be higher than the rotary speed of the installations in the second row. By virtue of the considerations already described above, the consequence of this is that the wind power installations in the first row generate the highest sound level, which is all the more serious in regard to the immission point because the installations of the first row are those which are closest to the immission point A.

As can be seen from FIG. 2, the wind park 10 with the wind power installations 1–9 is controlled by means of a data processing apparatus (for example a computer) 11. The data processing apparatus also processes inter alia values relating to wind direction, wind speed, time of day and sound level, which were measured at the immission point A or which can be assumed to occur there by virtue of previous measurements. The values in respect of wind speed or wind direction can also be ascertained by suitable measuring devices at the wind power installations. Overall control of all wind power installations of the wind park (or a part thereof) is possible by means of the data processing apparatus and, depending on the respective ascertainment of data in respect of time of day, wind direction, wind speed and/or sound output level at the immission point A the data processing apparatus controls control units of the wind power installations 1–9 so that the rotary speed thereof is reduced or the installation to be controlled is operated with a different rotary speed-output characteristic. A reduction in the rotary speed of a wind power installation can mean that the output is also correspondingly reduced. It is certainly possible for the output of the wind power installation to remain the same, with a reduced rotary speed, because at the same time, by pitch regulation of the rotor blades (this is known in regard to wind power installations of type E-40), it is also possible to operate the wind power installations with a different rotary speed-output characteristic.

In the case of the wind park control in accordance with the invention, the installations in the first row are drastically reduced in terms of their power output and/or rotary speed because the distance to the house A is closest and those installations therefore make the greatest contribution to the level of sound immission. The installations in the second row (Nos 2, 5 and 8) thereby receive a higher wind speed and thus produce a higher level of power. Without the regulation according to the invention, there would automatically be a falling level of power or a falling sound output level of the wind installation in the direction of the wind. With the control (regulation) according to the invention of the wind power installation, the natural distribution is mirrored to a greater or lesser extent without in that respect losing electrical energy (kWh) worth mentioning, because the amount of power by which the installations in the first row are cut back can be made up by the installations in the following rows.

This will be described in greater detail by means of an example of the calculations involved. This will be assumed to be based on the scenario shown in FIG. 2, with a wind park comprising nine wind power installations of type E-40 (Enercon), a wind speed in row 1 (installations 1, 4 and 7) of 12 m/sec, with a spacing between the rows of 300 m in each case and with a distance of the installation 2 from the immission point A of 400 m. With the standard mode of operation, that gives the following distribution of power output and sound output levels:

|  | Row 1 | Row 2 | Row 3 |
| --- | --- | --- | --- |
| Installation numbers | 1/4/7 | 2/5/8 | 3/6/9 |
| Wind at hub level [m/s] | 12 | 10.7 | 9.2 |
| Power [kW] | 462 | 365 | 235 |
| Sound output level [dB(A)] | 100.4 | 99.4 | 98.3 |

In this case the sound level occurring at the immission point A would be about 42 dB(A). In the event that a sound level of 40 dB(A) at the immission point has to be observed during the nighttime period, there are the following options.

In the case of installations which are not operated at a variable speed, for example the installation which is closest to the immission point A (installation No 2) has to be shut down. That results in the loss of the power output otherwise produced by that installation.

In the case of installations which are to be operated at a variable speed, of type E-40 (these installations can also be operated with different rotary speed-output characteristics) and with the wind park control in accordance with the invention the entire row 1 of the wind park can be reduced in respect of the rotary speed (and possibly also output) while in a corresponding fashion the other two rows are operated at an increased level of power, by virtue of the higher wind speeds which then occur. However, the levels of sound output which are also increased as a result, at the installations in the second and third rows, do not contribute a relevant amount to the sound level at the immission point A, by virtue of their distance. In that case then for example the values are as follows:

| Wind park according to the invention | Row 1 | Row 2 | Row 3 |
| --- | --- | --- | --- |
| Installation numbers | 1/4/7 | 2/5/8 | 3/6/9 |
| Wind at hub level [m/s] | 12 | 11.4 | 10.7 |
| Power [kW] | 210 | 280 | 365 |
| Sound output level [dB(A)] | 98.0 | 98.5 | 99.4 |

Accordingly there is a sound level of about 40 dB(A) at the immission location A, without shutting down an installation.

The particular advantage of the wind park operating method according to the invention is that, when planning wind parks with sound immission levels which are tight (or difficult) to be observed, it is possible for the park planning to be rather more generous as sound limit values essentially only have to be observed at night. Under some circumstances that also makes it possible to set up one installation more (than would otherwise be possible), which can have a positive effect on the economy of a wind park project because the available wind park area is put to better use.

What is claimed is:

1. A method of operating a wind park comprising at least two wind power installations, wherein the rotary speed of at least one wind power installation is set in dependence on the wind direction and/or the wind strength and/or the time of day, in such a way that a predetermined sound level is not exceeded at a predetermined immission point.

2. The method of operating a wind park as set forth in claim 1 wherein the sound level is measured at the immission point, and the measured value is processed by a data processing installation, by means of which the wind power installations of the wind park are controlled.

3. The method as set forth in claim 1 wherein with a reduction in the rotary speed of individual wind power installations, the overall output of the wind park is not reduced or is reduced only slightly, for example not more than 25%.

4. The method as set forth in claim 1 wherein, in the case of a wind whose direction is substantially from the immission point towards the wind park, the wind power installation or installations which is or are closest to the immission point is or are reduced in respect of their power output and/or rotary speed.

5. The method as set forth in claim 1 wherein the wind power installations are rotary speed-variable wind power installations.

6. The method as set forth in claim 1 wherein the rotary speed and/or power of first wind power installations on which the wind is first incident is/are set below their maximum possible value so that the second installations which are behind the first installations in the wind direction also experience the wind at a higher wind speed.

7. The method as set forth in claim 1 wherein the first installations are positioned in front of the second installations in the wind direction and the first installations produce a lower rotary speed and/or a lower level of power than the second installations.

8. The method as set forth in claim 1 wherein the wind park has a plurality of wind power installations which are arranged at different distances relative to an immission point, wherein the rotary speed of the wind power installations which are furthest away from the immission point is higher than the rotary speed of the installations which are closest to the immission point, and/or that the produced power of the wind power installations which are furthest away from the immission point is greater than the power produced by the wind power installations which are closest to the emission point.

9. A wind park having at least one wind power installation in which the wind power installations of the wind park or a part thereof are controlled according to the method of claim 1.

10. A method of operating a wind park comprising:

positioning a first wind power installation at a first location;

positioning a sound sensing device at a second location;

measuring a sound level being emitted by the first wind power installation at the second location; and controlling the speed of the first wind power installation in such a way that a predetermined sound level is not exceeded as measured at the second location.

11. The method according to claim 10 further including:

positioning a second wind power installation at a third location relative to the first location and further from the second location; and increasing the rotational speed of the second wind power installation at the third location when the rotational speed of the first wind power installation at the first location is reduced.

12. The method according to claim 10 further including changing the angle of attack of the first wind power installation structure in order to reduce its rotational speed.

13. The method according to claim 12 wherein the step of reducing the angle of attack is carried out by varying the pitch of rotor blades with respect to the wind so as to operate the wind power installation with a lower rotary speed and output characteristic.

14. The method according to claim 10 wherein a pitch of blades of the first wind power installation are set below a maximum possible rotational value, the selected pitch being based on the noise emitted at the second location being less than a selected value.

15. The method according to claim 11 wherein the power output by the second wind power installation is greater than the power output by the first wind power installation.

16. The method according to claim 15 wherein the second wind power installation is spaced behind the first wind power installation in the direction of the wind.

* * * * *